Jan. 8, 1929.　　　　　　　　　　　　　　　　　　　1,698,192
T. F. GOODFELLOW ET AL
GASKET
Filed Oct. 3, 1924
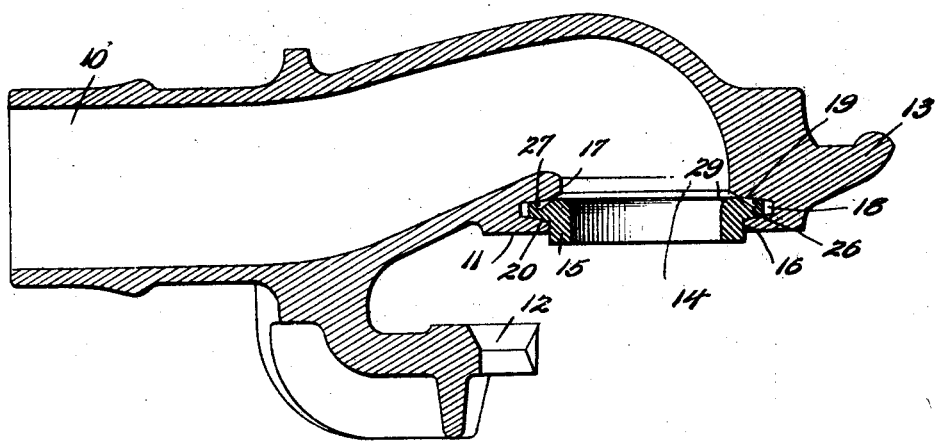
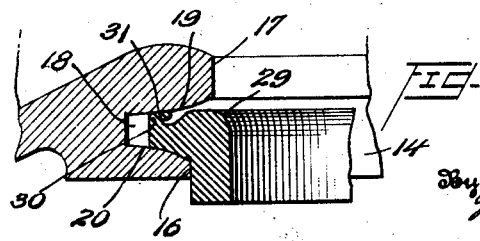

Patented Jan. 8, 1929.

1,698,192

UNITED STATES PATENT OFFICE.

THOMAS F. GOODFELLOW AND KARL E. HOFAMMANN, OF ALTOONA, PENNSYLVANIA.

GASKET.

Application filed October 3, 1924. Serial No. 741,476.

This invention relates to gaskets, and more particularly to gaskets for use with air line coupling heads of either the automatically or manually connectable type.

It is a general object of this invention to provide a novel and improved type of gasket for the above use.

More particularly, it is an object of this invention to provide a gasket of the type described which will effect an air-tight seal between itself and the coupling head under extremely adverse conditions and which will remain tight in spite of wear and normal shrinkage of the material from which it is constructed.

Another object of the present invention consists in the provision of an improved gasket which is adapted to fit in the circumferential groove of the standard American Railway Association air line coupler head but which will produce more effective seal than the standard gasket at present in use with such coupler heads.

The air lines used for the operation of automatic brakes and for various other pneumatic control and signal devices on railway cars are provided at the end of each car with a connecting member having at its end a coupling head adapted to be connected either automatically or manually to a corresponding coupling head on the adjacent car. It is common practice to interpose between the two coupling heads a pair of gaskets, one mounted in each head, and it is particularly important to prevent any leakage between the abutting faces of the two gaskets, and between each gasket and the head carrying it, in order to economize in the consumption of air from the compressor. It has been found that the common form of gasket used with the American Railway Association style of coupling head, which is practically universal in use throughout this country, permits considerable leakage, frequently immediately on coupling the heads, and very often after a very short period of use, due to the fact that the gaskets do not fit the heads tight enough, even when first installed, or lose their tight fit because of wear and the normal shrinkage of the material from which the gaskets are constructed, which material is usually a rubber composition. Furthermore, the grooves in which the flanges on the gaskets fit are subject to rusting, thus producing a roughened surface, preventing air-tight contact between this surface and the face of the gasket flange. This invention therefore contemplates an improved type of gasket which will overcome these difficulties and remain air-tight under even the most adverse conditions of wear, shrinkage and rust.

In the accompanying drawing, there is disclosed a single embodiment of the invention, it being understood, however, that the particular form disclosed is subject to various modifications and changes such as fall within the scope of the attached claims without departing from the spirit of the invention.

In said drawing:

Figure 1 is a longitudinal section through a single standard American Railway Association coupling head taken on a plane including the axis of the gasket and showing an improved gasket, according to this invention, in position;

Figure 2 is a diametrical sectional view of the improved gasket; and

Figure 3 is a fragmentary section through a portion of a coupling head showing the improved gasket in position, drawn on an enlarged scale.

The standard American Railway Association coupling head for air lines on railway cars comprises a unitary casting having the longitudinal bore 10 and the laterally positioned face 11 adapted to be placed adjacent a similar face on a complementary coupling head, the two parts being held in position by means of the helical cam face 12 cooperating with the lug 13 on the complementary member. The lateral face is provided with a circular bore 14 for the passage of the air from one member to the other, and in order to form an air-tight joint between the two members, each one is provided with a gasket 15 of some flexible, resilient material such as a rubber composition.

The bore 14 is at right angles to the face 11 and is circular, being at the outer end 16 of a larger diameter than at the inner end 17, a radial groove 18 being formed between the two diameters of this bore. This groove is of substantial length axially and the side walls thereof diverge from the bottom of the groove toward the center of the bore 14 providing the chamfered faces 19 and 20.

It has been the standard practice to provide a gasket somewhat as shown in Figure 2 comprising a ring of angular cross section having an axially disposed leg and a radially disposed flange with a chamfered edge on the inner radial face of the flange to cooperate with the chamfered portion 20 of the groove 18. The rear face of the flange is, however, flat. These rings are placed in position by compressing them and allowing the flange to expand into the groove 18 so that only the outer circumferential edge of the rear radial face is supported upon the chamfered wall 19 of the groove in the head. The ring portion 21 is provided with the flat end face 25, which abuts longitudinally against the corresponding face of a duplicate gasket in the complementary head and forms therewith an air-tight connection between the two gaskets. Due to the cam action of the parts 12 and 13, the gaskets are somewhat displaced axially which results in a diaphragmatic action of the flange, which as previously explained is only supported at its outer edge. This action makes it possible to take advantage of the resilient qualities of the flange of the gasket to assist in maintaining a tight contact between the flat faces 25 of the abutting gaskets. The tightness of contact between the rear face and the chamfered wall 19 is dependent entirely upon the resilience of this flange with the result that any appreciable wear on the rear face of the gasket or any roughness due to rusting on the chamfered wall 19 will result in leakage between these two faces and consequent loss of air. The normal pressure of the air within the head tends to unseat the rear face from the wall 19 at all times. It is not possible to overcome this difficulty by increasing the distance between the front and rear faces in order to afford a tighter fit between these faces and the walls of the groove, as it is practically impossible to position such a thickened flange within the groove.

The gasket shown in Figure 2 is constructed along the lines of that above discussed, but the rear face is altered by means of the circumferential channel 26 leaving the axially disposed bead or lip 27 at the outer edge of the gasket which has a materially greater length axially between the face 28 and the face 23 than has the usual edge of the standard gasket. Furthermore, the portion inwardly of the channel 26 is reduced in height and rounded as shown at 29 so that the edge 28 of the lip 27 extends a material distance above it.

A consideration of Figure 3 discloses the result when such a gasket is placed within the standard type of groove in the American Railway Association coupling head. The lip or bead 27 is folded inwardly toward and into the channel 26 so that the portion 30 thereof is placed in tension and the portion 31 is placed under compression, with the result that there is always a normal tendency for the gasket to be tightly forced against both the chambered walls 19 and 20 of the groove, which tendency is considerably augmented by the air pressure within the coupling head acting upon the inner wall of the lip and forcing it upwardly and the flange itself downwardly, as shown in Figure 3, giving exactly the opposite action from that obtained with the standard gasket wherein the normal tendency of the air is to force the face of the flange away from the surface 19. Furthermore, the diaphragmatic action described in connection with the usual form of gasket is greater in the applicant's type than obtained with the standard gasket.

A gasket constructed according to this invention is easier to place in position, due to the resilience of the thin lip which necessarily moves radially into the groove and is folded to the position shown in Figure 3 quite readily. The compositions from which such gaskets are constructed are subject to shrinkage during their normal use, but it will be apparent that such shrinkage can have no material or detrimental effect upon the tightness of fit of this improved form of gasket. The thinness of the material of the lip 27 allows it to readily conform to irregularities due to wear, improper machining or rust on the wall 19 of the groove, and thus an air-tight joint is effected at all times and under the most adverse conditions.

Actual demonstrations covering a considerable period of time have proved the above results beyond a doubt, and comparisons between the two forms of gaskets have established the superiority of the style described herein.

It may be well to note that owing to the diaphragmatic action of the gasket, the rounded face 29 may be pressed into engagement with the chamfered wall 19 of the groove and assist the flexible lip in maintaining the air-tightness of the joint, but it has been found, however, that such action is not entirely necessary.

From the above description, it is evident that this invention provides a novel and improved form of gasket which is interchangeable with the standard gasket, can be constructed with the same facility as the standard form, requires less material, has a greatly increased life, produces a more effective seal, enables the use of worn and rusted coupling heads, and is considerably easier to slip into position. But one embodiment of the invention has been disclosed, but it will be evident to those skilled in the art that it is subject to various modifications such as fall within the scope of the appended claims.

Having thus described our invention what we claim as new and desire to be secured by Letters Patent is:

1. A gasket for air line couplings, comprising a ring of resilient material angle shaped in cross section, one leg of the angle being substantially parallel to the axis and the other projecting outwardly therefrom, and a flexible lip projecting axially from said other leg on the side opposite said first leg, the walls of said lip being substantially parallel to each other and to the first mentioned leg.

2. A gasket for air line couplings, comprising a ring of resilient material angle shaped in cross section, one leg of the angle being substantially parallel to the axis of said ring and the other extending radially outward therefrom, the radial face of said other leg having an annular channel therein, the outer wall of said channel being higher than said radial face.

3. A gasket for use with an air line coupling head provided with a face having a circular opening therein, and a circumferential groove in the wall of said opening, said gasket including a ring of resilient material adapted to fit within said opening and project beyond the face thereof, a circumferential flange on said ring adapted to fit into said groove, and a bead on the outer edge of said flange adapted to be folded inwardly when said ring is placed in position in said coupling, the inner end of the ring being positioned to engage the same wall of the groove as the bead when a pair of coupling heads are connected.

4. The combination with an air control line coupling head provided with a face having a circular opening therein, and a circumferential groove, with diverging walls, in the wall of said opening, of a gasket including a ring of resilient material adapted to fit in said opening and having a face projecting beyond the face of said coupling head for cooperation with a similar face on a complementary head, a circumferential flange on said ring adapted to fit into said groove, and a lip projecting axially from said flange near the outer edge thereof and adapted to be bent inwardly by the walls of said groove when said ring is placed in position.

5. The combination with an air control line coupling head provided with a face having a circular opening therein, and a circumferential groove with diverging walls in the wall of said opening, of a gasket including a ring of resilient material adapted to fit in said opening and having a face projecting beyond the face of said coupling head for cooperation with a similar face on a complementary head, a circumferential flange on said ring adapted to fit into said groove, and a lip having both its walls projecting substantially axially from said flange and adapted to be bent inwardly by the walls of said groove when said ring is placed in position, the end of the ring being normally out of contact with the adjacent side wall of said groove.

6. A gasket of resilient material for air line couplings comprising a tubular portion, a circumferential flange at one end of said tubular portion, the end face of said flange having a groove therein about midway of the width thereof, and a relatively thin wall projecting axially from the outer edge of said flange and adapted to be folded down into said groove for the purpose described.

In testimony whereof we hereunto affix our signatures.

THOMAS F. GOODFELLOW.
KARL E. HOFAMMANN.